(12) United States Patent
Narasimhan et al.

(10) Patent No.: US 9,954,811 B2
(45) Date of Patent: Apr. 24, 2018

(54) EMAIL NOTIFICATION ON MOBILE DEVICES

(71) Applicant: International Business Machines Corporation, Armonk, NY (US)

(72) Inventors: Vineeth Narasimhan, Bangalore (IN); Kartik Srinivasan, Bangalore (IN); Ari Eisinger, Lansdowne, PA (US); Omanand Jha Vatsa, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 452 days.

(21) Appl. No.: 14/808,084

(22) Filed: Jul. 24, 2015

(65) Prior Publication Data

US 2016/0028677 A1 Jan. 28, 2016

Related U.S. Application Data

(60) Provisional application No. 62/028,867, filed on Jul. 25, 2014.

(51) Int. Cl.
*G06F 15/16* (2006.01)
*H04L 12/58* (2006.01)
*H04L 29/08* (2006.01)
*H04W 4/12* (2009.01)

(52) U.S. Cl.
CPC .............. *H04L 51/24* (2013.01); *H04L 51/22* (2013.01); *H04L 67/16* (2013.01); *H04L 67/10* (2013.01); *H04W 4/12* (2013.01)

(58) Field of Classification Search
CPC ......... H04L 51/24; H04L 51/22; H04L 67/16; H04L 67/10; H04W 4/12
See application file for complete search history.

(56) References Cited

U.S. PATENT DOCUMENTS 9,794,117 B2 * 10/2017 Narasimhan ........ H04L 41/0806
2010/0088387 A1 * 4/2010 Calamera ................ H04L 51/24
    709/207
2016/0087955 A1 * 3/2016 Abdul ........................ G06F 8/60
    726/7

* cited by examiner

*Primary Examiner* — John B Walsh
(74) *Attorney, Agent, or Firm* — Pepper Hamilton LLP (57) ABSTRACT

Methods and systems for providing notifications to mobile device utilize a cloud extension agent operating on a corporate network for sending notification requests via a cloud-based service. An application on the user's mobile device is configured to receive push notifications sent via the cloud extension agent, while receiving email messages directly from corporate email server. A user can select notification settings, allowing the cloud extension agent to be configured remotely via a cloud to provide appropriate notifications to the user.

20 Claims, 7 Drawing Sheets

EMAIL NOTIFICATION ON MOBILE DEVICES

CROSS REFERENCE TO RELATED APPLICATIONS

This application claims priority to U.S. provisional application Ser. No. 62/028,867 filed Jul. 24, 2014, which is incorporated herein by reference in its entirety.

TECHNOLOGY FIELD

The present invention relates generally to endpoint mobility management, and more particularly to providing notifications of pending messages to mobile devices.

BACKGROUND

Endpoint mobility management allows users to bring their own device to organization, and allow users to securely access corporate resources using that device. Until recently, corporate email was dominated by the use of Blackberry devices and the Blackberry enterprise server (BES). Using the Blackberry model, an email client was part of the operating system of the mobile device, while the enterprise server could directly access corporate email on the corporate network and act as a proxy to forward email to the device. As corporations have expanded away from the Blackberry model, new mobile operating systems, such as Android, iOS, Windows phone, etc. have become commonplace. While most of these mobile operating systems include a native email client, these clients lack data security controls for corporate data.

Meanwhile, third party applications have become commonplace on mobile devices, as users strive for additional functionality. While these applications may provide additional functionality not provided by the operating system or native applications provided with the operating system, many mobile operating systems do not afford these applications the same privileges as native applications. For example, iOS provides a native email client that can persistently run, allowing it to update the status of messages on the device home screen, while it runs in the background. Meanwhile, third party email clients can only run while the user is actively using the application, or for a short time thereafter. This means that these third party email applications need to use additional tricks to update email status and real-time, when the app is not actively opened.

Certain email applications, such as Gmail from Google, utilize a server-based service provided by Apple for iOS, called Apple push notifications (APNS). APNS is a service provided by the operating system vendor that allows registered applications and software vendors to push notifications from the Internet to the device operating system, once a user has granted such permissions. However, for a messaging application to utilize these push notifications, some server or cloud-based component of that application needs to have access to email messages stored on the server. In the example of Gmail, this is not a problem, because the Gmail application works with email where Google is the service provider, giving the Gmail application control over both the user experience on the device and the management and delivery of email messages at the server level. While this may be satisfactory for large ISPs, applications hoping to provide messaging support for corporate email resources lack the luxury of controlling the corporate email server, in addition to the mobile application.

Accordingly, applications for use with secure corporate email resources have generally lacked notification features like those provided by end-to-end email solutions or the native messaging applications provided with a mobile operating system.

SUMMARY

It is desirable to provide an email notification system that provides notifications of pending emails on corporate email servers where a user is not using the native email client on a mobile device. For example, a endpoint mobility management vendor can provide a secure email client for accessing email on a corporate system in a compliant manner. It is further desirable to allow delivery to that email client without placing EMM systems between email server and that client for purposes of delivery. Embodiments utilize a cloud extension agent on the corporate network to provide notification services to a mobile device without acting as a proxy for email delivery.

According to one embodiment, a notification system includes a cloud extension agent operating on a computer on a corporate network that is configured to receive first notification information from an email server on a corporate network and to send a first request for notification of a user of the mobile device via a cloud-based service. A cloud-based service is configured to receive the first request from the cloud extension agent over the Internet and to send a second request for notification of the user to a notification service provided by a manufacturer of the mobile device. A mobile application on the mobile device, separate from an operating system of the mobile device is configured to allow the user to retrieve email messages from the email server, wherein retrieval of the email messages is not provided by the cloud extension agent or the cloud-based service. The cloud extension agent can include software (e.g. provided by an EMM vendor) that operates on a corporate network (e.g. operating on customer premises) to provide an extension of cloud services for management and notification, utilizing corporate resources/servers. A cloud-based service can be provided by an EMM vendor, and generally refers to one or more servers or data centers that collectively provide a network based service, interfacing with the cloud extension agent and facilitating any of the actions disclosed herein.

According to one aspect, the notification service is a push notification service provided by a vendor of the operating system of the mobile device, such as APNS provided by Apple, GCM provided by Google or WNS provided by Microsoft for mobile devices utilizing operating systems provided by these respective companies. In some embodiments, the mobile device is an iOS device. In other embodiments, the mobile device is an Android device or Windows Phone device.

According to another aspect, the email server is a server, such as an Exchange server, provided by an operator of the corporate network. In some embodiments, the cloud extension agent initiates an outbound connection through a firewall that separates the corporate network from the Internet to the cloud-based service. In some embodiments, the cloud-based service includes a endpoint mobility management service that enforces security policies for the mobile device. This service can operate on one or more servers provided by a endpoint mobility management vendor, which are connected to the cloud extension agent via the Internet.

According to another aspect, the mobile application is configured to provide an interface that allows the user to selectively change notification settings. In some embodiments, the mobile application is further configured to report the notification settings to the cloud-based service to allow the cloud-based service to configure the cloud extension agent to utilize the notification settings.

According to another embodiment, a method for providing notifications to a mobile device includes providing a cloud extension agent for operation on a computer on a corporate network, that is configured to receive first notification information from an email server on a corporate network and to send a first request for notification of a user of the mobile device via a cloud-based service. The method further includes providing a cloud-based service configured to receive the first request from the cloud extension agent over the Internet and to send a second request for notification of the user to a notification service provided by a manufacturer of the mobile device and providing a mobile application for operation on the mobile device, separate from an operating system of the mobile device, that is configured to allow the user to retrieve email messages from the email server, wherein retrieval of the email messages is not provided by the cloud extension agent or the cloud-based service.

According to a further embodiment, a non-transitory computer readable medium includes instructions configured to provide a cloud extension agent operating on a computer on a corporate network configured to receive first notification information from an email server on a corporate network and to send a first request for notification of a user of a mobile device via a cloud-based service. A non-transitory computer readable medium further includes a cloud-based service configured to receive the first request from the cloud extension agent over the Internet and to send a second request for notification of the user to a notification service provided by a manufacturer of the mobile device, and a mobile application on the mobile device, separate from an operating system of the mobile device configured to allow the user to retrieve email messages from the email server, wherein retrieval of the email messages is not provided by the cloud extension agent or the cloud-based service.

DETAILED DESCRIPTION OF ILLUSTRATIVE EMBODIMENTS

Certain mobile operating systems (OS), such as iOS, provide the advantage to the native email client that the email client can run continuously in the background on the device, as part of the OS. Whenever there is a new email at a server, the native client gets information about the email and can show a notification to the user, such as on a home screen. Third party applications for iOS devices lack this advantage. This is primarily because third party email applications only run for limited time after a user has switched from the application. Thus, if an email is waiting at the server, unless the third-party application on the mobile device is currently open, it is difficult for that application to receive information about that email from the server to display notification to the user.

Rather than allowing a server to directly alert an application on the mobile device, notifications can be pushed through an official channel of the operating system, such as through a notification service provided by the vendor of the mobile operating system. In the case of iOS, Apple provides Apple push notifications (APNS), allowing the service on a server to alert the APNS server of an event to be delivered to a user's mobile device. If the user has registered to receive such notifications from the APNS server, the APNS server relays the notification information to the mobile device operating system. While APNS is used herein as an example, embodiments are not limited to iOS or APNS. The notification services provided by Apple are merely illustrative of the types of notification services that can be provided by the vendor of a mobile operating system. For example, embodiments could use push notification services provided by Google as part of its Google cloud messaging (GCM) push notification service, available to Android devices or using Windows Notification Service (WNS) available on Windows devices. It is anticipated that as mobile operating systems evolve, additional vendors and additional push notification services will become available that can be readily used in the same manner as APNS or GCM in accordance with the embodiments disclosed herein.

While a push notification service can be useful for delivery notifications to a device, there still must be a way to connect server content with the notification service. One solution in the prior art is to provide both the email hosting services and the email app on a mobile device. For example, the Google Gmail application utilizes an application on a mobile device, as well as providing email hosting servers and email services in the cloud. Because Google controls both the mobile application and the servers hosting the email, linking information from email servers to a push notification service is trivial.

Generally, third party applications that provide email functionality on the device for use with other third-party email hosts cannot easily utilize this framework. This is particularly interesting in the context of corporate email, where a corporation will manage its own email servers. These typically allow a user to access email servers using certain applications, by utilizing common email access protocols, such as ActiveSync. While third party email applications on the device can access these corporate email servers, once properly configured, when the application is running, these email applications encounter difficulty when they are not actively running on the device. In the interest of saving battery life and providing device security, modern mobile operating systems typically do not allow third party applications to persistently run on a device. Thus, these third party applications lack any information about messages waiting on corporate email servers when the user is not actively using the email application.

One workaround is to provide a proxy system, whereby a server sits between the corporate email server and the mobile device. In such a system, the proxy server can intercept email intended for the user of the mobile device, access contents, send notifications to the operating system of the device via a push notification service, and deliver the messages to the device when the user opens the application. A large drawback of a proxy system is that it provides a single point of failure or bottleneck. Whereas most corporate email systems allow the mobile device to directly communicate with corporate email services, placing a proxy server for the vendor can slow this process down, introduce a security hole with an additional party accessing the email, and provide a single point of failure or bottleneck that can disrupt delivery of corporate emails.

Embodiments of the proposed solution utilize a cloud extension agent at the corporate network that provides notification services without acting as a proxy for mail delivery. An exemplary cloud extension agent is described in U.S. patent application Ser. No. 13/347,352, incorporated herein by reference. Exemplary cloud extension agents may also be used for endpoint mobility management (EMM) services, allowing an EMM vendor to manage device security to ensure that mobile devices accessing corporate resources and email servers are in compliance with corporate security policies. These cloud extension agents can also be used to provide notification of pending messages to mobile devices using the systems and methods described herein.

As used herein, EMM refers to remote management of mobile assets, such as protecting corporate data shared with mobile devices, provisioning network access to that data by those mobile devices, and authenticating users of those mobile devices. Mobile device management (MDM) is a subset of EMM, and generally also includes managing the device and provisioning or restricting applications on that mobile device. Embodiments disclosed herein are suitable for EMM and MDM systems, but will refer to EMM for simplicity.

Because the cloud extension agent does not sit between the mobile device and corporate email servers, the cloud extension agent does not act as a bottleneck or proxy for the delivery of messages. Thus, the cloud extension agent can facilitate notification of a user of the mobile device and a pending message waiting at the server, allowing the mobile device to directly communicate with the corporate email server to deliver the message. This can allow functionality on par with end-to-end email solutions used by email service providers, while using corporate email servers or legacy servers, such as Lotus or Exchange servers. Thus, an organization can provide desired functionality to mobile devices without greatly affecting or changing the normal flow of email delivery. Moreover, should the cloud extension agent fail, mail delivery will still operate, but notifications of pending messages when an app on a mobile device is not active may not work. Accordingly, failure of the cloud extension agent does not result in catastrophic loss to productivity.

A cloud extension agent allows configuration of services on the corporate network via a remote data center which may be part of a service cloud. An EMM vendor can operate this service cloud to manage the cloud extension agent on the corporate network to allow remote administration and configuration of corporate resources, such as corporate email servers. By providing an extensible agent on the corporate network, additional functionality can be created, for example, the cloud extension agent behind the corporate firewall can easily interface with the corporate email server to receive notifications of pending messages, without intercepting or hindering message delivery. The cloud extension agent can gather this notification information from corporate email servers and communicate this information to the service cloud using a secure connection, such as the secure outbound connection used to receive management commands from the service cloud, as described in U.S. patent application Ser. No. 13/347,352.

Once a cloud extension agent has gathered notification information from corporate email servers, the cloud extension agent can facilitate pushing notifications to a user's device via a notification proxy in the service cloud, or by directly talking to a push notification service provided by the vendor of the mobile operating system. In some embodiments, the cloud extension agent participates in endpoint mobility management. The cloud extension agent can readily identify the proper push notification service to use based on the user's device. Furthermore, in these embodiments, because the cloud extension agent is managed by a service cloud that provides endpoint mobility management services, the cloud extension agent can be easily configured to conform to device settings and preferences set by a user of the mobile device. This allows a feature rich user experience to be facilitated by the cloud extension agent, allowing a user to set up notification preferences in an extensible manner. In embodiments where the cloud extension agent does not participate in endpoint mobility management, device settings can be manually configured for this information to be provided by a endpoint mobility management system.

By utilizing a push notification service, third party applications can receive notifications of pending messages without constantly running. Thus, even in mobile operating systems that allow applications to run in the background can take advantage of these embodiments, allowing messaging applications to receive notifications without having to run in the background. This can reduce processing and memory overhead for those messaging applications not actively being used, and can greatly reduce power consumption on mobile devices, extending battery life.

The email server used in some embodiments can be run by an external third-party entity. This can include, for example, Exchange, Lotus Notes, or even the Google applications for Enterprise, run by a corporate customer that utilizes a endpoint mobility management platform, such as MaaS360 by Fiberlink Corp. It should be noted that this solution is not necessarily tied to endpoint mobility management as device management functionality is not necessarily provided by embodiments. Generally, the email service provider and/or the email client vendor lack the ability to communicate information from the email service provider to the client via the push notification service, without an additional service, such as a service provided by a cloud extension agent.

Figure 1:
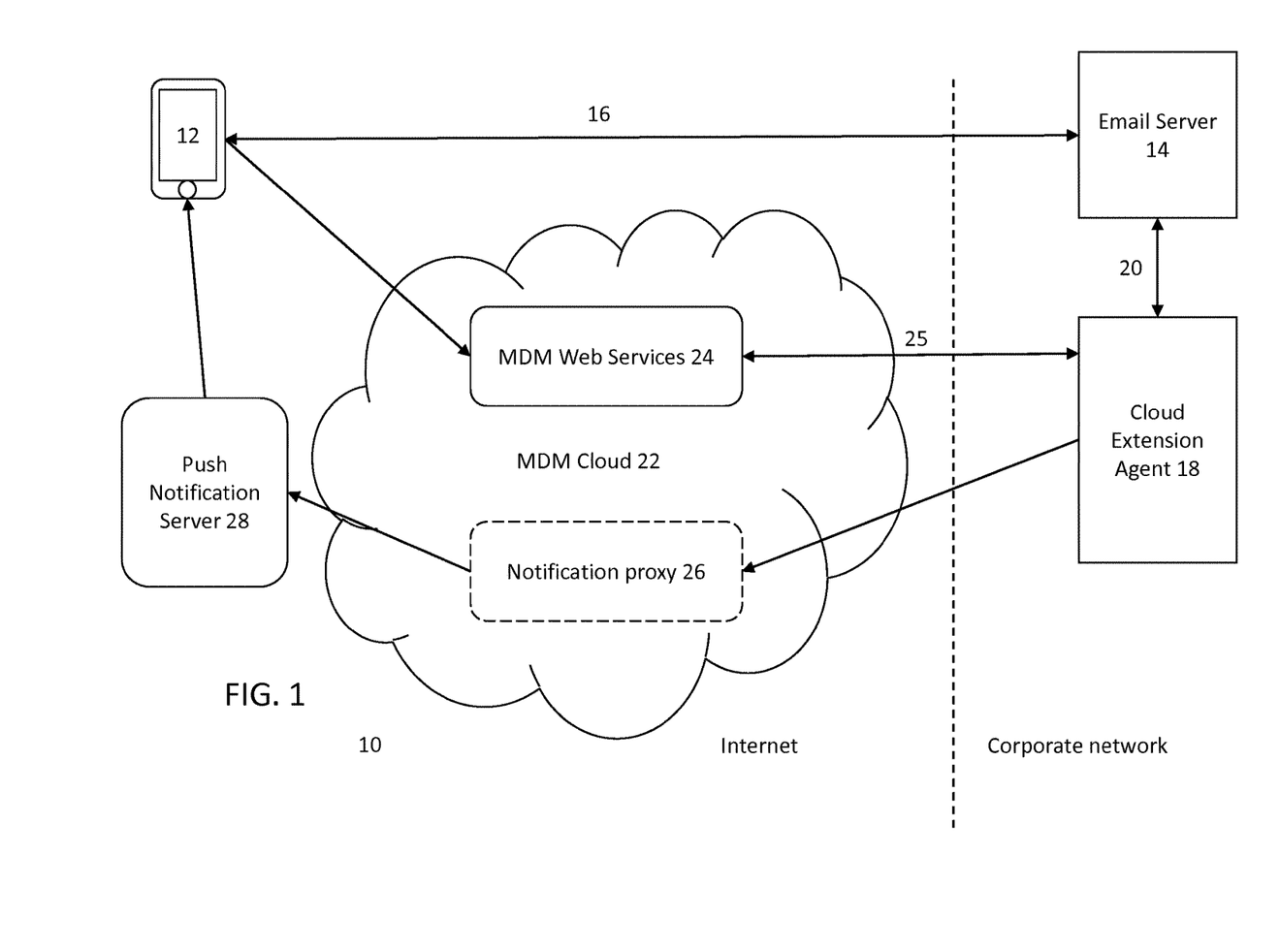
FIG. 1 is a system diagram for an exemplary system for providing notifications in accordance with some embodiments.

FIG. 1 shows an exemplary system 10 for use with embodiments. Mobile device 12 exchanges emails with email server 14 over Internet link 16. Internet link 16 operates in accordance with normal email delivery. As can be seen, the notification system does not interfere with email delivery over link 16. Instead, cloud extension agent 18 provides side channel communication of notifications between the email server 14 and the mobile device 12. Cloud extension agent 18 communicates with email server 14 over a network link 20, which is part of the corporate network to which the email server belongs. Link 20 is within the corporate network's firewall, allowing notifications to be sent from email server 14 to the cloud extension agent 18 without providing a network security hole. In some embodiments, email server 14 may be provided by an external service provider, allowing cloud extension agent 18 to communicate via a link 20 to that service provider, allowing notifications to be received from the service provider, without acting as a mail delivery proxy between the service provider the device 12.

Cloud extension agent 18 utilizes EMM service cloud 22 to receive updates about mobile device status and configuration, allowing a user to make changes to desired notification settings. When a user updates settings for notifications on mobile device 12, device 12 communicates with EMM web services 24, which are part of the EMM service cloud.

EMM web services 24 communicates with cloud extension agent 18 via connection 25. In some embodiments, connection 25 is initiated as an outbound connection from cloud extension agent 18 to the EMM service cloud 22, through a corporate firewall that protects a corporate network from the Internet. By initiating this connection as an outbound connection, connection 25, may be established without requiring opening additional ports in the firewall of the corporate network. EMM web services 24 can participate in endpoint mobility management of mobile device 12. Accordingly, EMM web services and cloud extension agent 18 can communicate about numerous configurations and settings unrelated to notifications. In addition to typical endpoint mobility management actions configurations, connection 25 can be used to communicate user notification preferences from the mobile device and EMM service cloud to the cloud extension agent 18.

For example, if a user wishes to receive notifications of any unread emails from the last 24 hours, these settings can be changed in a endpoint mobility management application (or via an email client app that works with the EMM system) on mobile device 12 via the user interface of the device by the user. An EMM app on the mobile device 12 can communicate these settings to EMM web services 24. From settings changes, EMM web services 24 can determine if a server-level change is necessary. If so, the settings changes can be communicated via connection 25 to cloud extension agent 18. Upon receiving notice of the notification preference changes of the user, cloud extension agent 18 can update internal settings and can register with email server 14 to receive notifications about pending messages that match the user's preference criteria. The registration for these notifications and receipt of the notifications can be received over internal corporate network link 20, behind the firewall. Once cloud extension agent 18 is made aware of notifications, it can communicate these notifications to mobile device 10.

The way in which cloud extension agent 18 communicates notifications of pending messages to mobile device 10 can vary depending on the embodiment. In the embodiment shown in FIG. 1, cloud extension agent 18 sends a notification to the mobile device via a cloud-based notification proxy 26. Notification proxy 26 can be provided by the vendor of the EMM web services, allowing the EMM service cloud 22 to be the only entity that communicates across a corporate firewall with the cloud extension agent 18. Notification proxy 26 can be configured to communicate with a push notification server 28 provided by the vendor of a mobile operating system of mobile device 10. Notification server 28 can be, for example, an APNS server provided by Apple for pushing notifications to iOS devices or a GCM notification server provided by Google for pushing notifications to Android devices.

In this embodiment, EMM service cloud 22 maintains one or more notification proxies 26 for the purpose of interfacing with these push notification servers provided by mobile device vendors. One advantage of using a notification proxy 26 is that notification proxy 26 can be assigned a single security certificate from the mobile device vendor for communicating with notification server 28. This can make the process of maintaining security certificates much easier than if each cloud extension agent 18 had to maintain a unique security certificate for interfacing with each notification server 28. For example, in some embodiments, there may be thousands of cloud extension agents 18, such as one agent for each corporate network that uses EMM service cloud 22, where each corporate network is independent and represents each customer of an EMM vendor. In some embodiments, to simplify the certificate maintenance process, the cloud-based notification proxy 26 is used, such that each cloud extension agent does not need to worry about directly interfacing with push notification servers provided by mobile device vendors.

Figure 2:
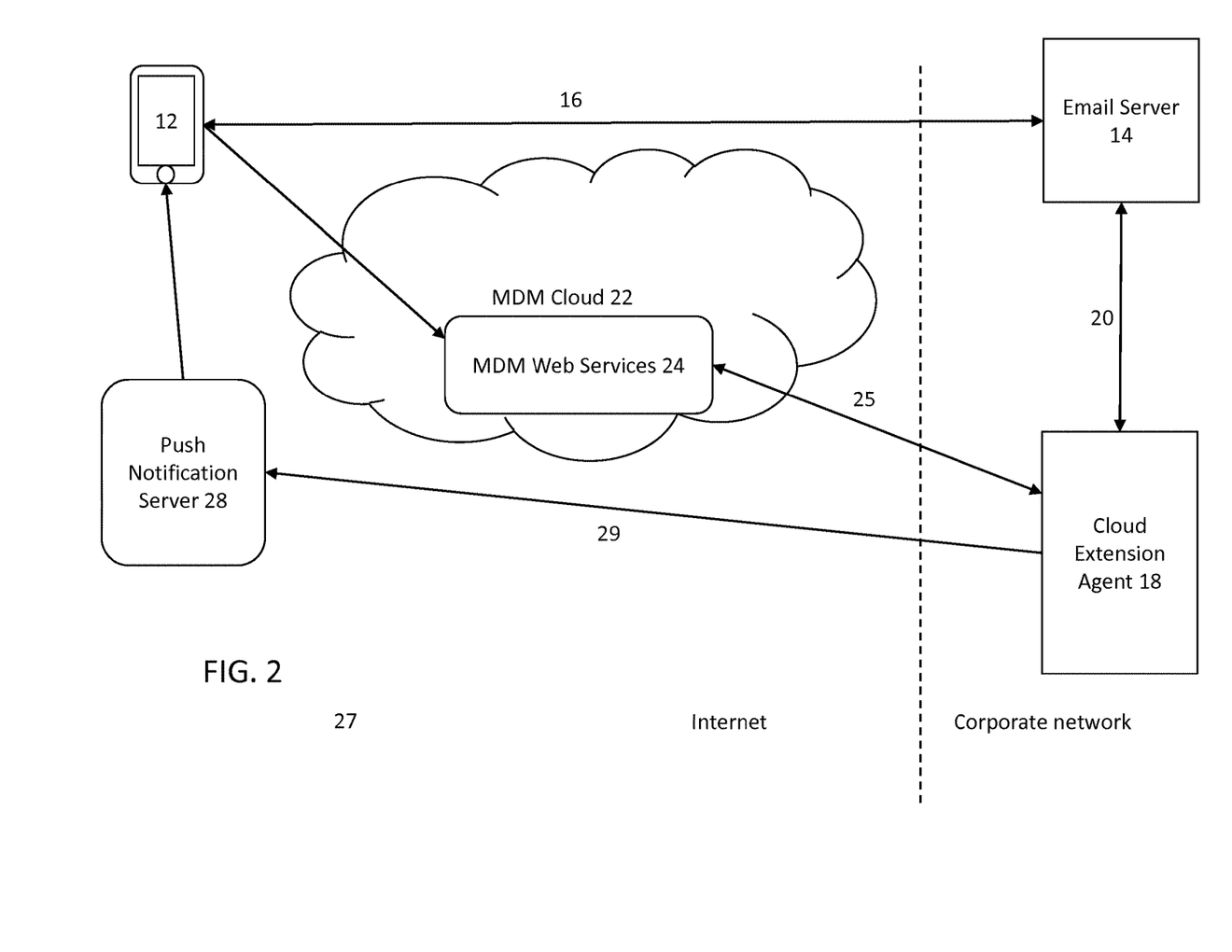
FIG. 2 is a system diagram for an exemplary system for providing notifications in accordance with some embodiments.

FIG. 2 shows an alternative embodiment 27 whereby cloud extension agent 18 communicates directly across the Internet with notification server 28. This can have the advantage of agility and robustness, whereby notifications do not need to be handled by EMM service cloud 22. This can assist with scalability and allow notifications to proceed even when there is a service outage of EMM service cloud 22. For example, generally an EMM service cloud 22 is designed to facilitate management of mobile devices, such as handling configuration changes and device status information. These changes do not occur with the frequency of email, which may involve hundreds of messages for each device daily. Accordingly, EMM web services component 24 and other components of an EMM cloud 22 may not be designed to handle a large volume of real-time traffic originating at a cloud extension agent 18. Generally, emails and other messages between the mobile device 12 and corporate network, including email server 14, do not traverse the EMM service cloud. Messages are handled by conventional network protocols and mechanisms, allowing the EMM service cloud to participate in management, but not delivery of messages. This design choice allows email to be delivered without latency and without an additional point of failure. Accordingly, it may require a large infrastructure change to EMM service cloud 22 to add notification proxy 26.

In some embodiments, a link 29 between cloud extension agent 18 a notification server 28 operates according to protocols selected by the vendor providing notification server 28, and this link operates independently of EMM service cloud 22. This allows better scalability of the EMM service cloud 22, as each cloud extension agent provides its own messaging services between the corporate network and notification server for a push notification service. This allows EMM service cloud 22 to focus on endpoint mobility management, it allows real-time notifications to be provided directly by cloud extension agent 18. In these embodiments, each cloud extension agent can have its own security certificate for interfacing with notification server 28. In some embodiments, a component of EMM service cloud 22 can participate in the management of the certificates to ensure that certificates are updated and maintained to facilitate communication between the cloud extension agent and the notification server 28.

One difference that can exist between the embodiments shown in FIGS. 1 and 2 is that the push notification server may require communication over a different port than is used by communications link 25. In some embodiments, link 25 utilizes HTTPS ports, which are typically exposed in a common corporate firewall configuration, allowing each cloud extension agent to initiate an outbound connection to the EMM service cloud. In some embodiments, a push notification server may require use of a different port, which may require manual configuration of the corporate firewall.

One advantage of utilizing a notification proxy between the cloud extension agent and the notification server is that it allows each cloud extension agent to operate independently of the mobile operating system being used for each mobile device. For example, for each mobile device, regardless of mobile operating system, cloud extension agent can send a notification of pending email to the cloud-based notification proxy. The notification proxy can then determine (based on device configuration information maintained in the EMM service cloud) the mobile operating system for each device. The proxy can then determine the appropriate way to push notifications to each mobile device. This allows each cloud extension agent to be operated without knowing the specifics of how each push notification must be sent. Furthermore, fewer security certificates need to be maintained, because certificates are only needed by notification proxies, rather than requiring a separate security certificate for each cloud extension agent, allowing likely thousands of cloud extension agents to communicate with push notification servers.

On the other hand, disadvantages of providing a notification proxy as part of an EMM service cloud include increased latency, as each notification must pass through the service cloud; scalability challenges as thousands of notification messages are passing through the EMM service cloud to the push notification server; security concerns as information in emails passes through the service cloud in the form of notifications; and the risk of failure of notification servers should a single notification proxy fail. An EMM platform is typically multitenant for purposes of endpoint mobility management services, such as configuring customer premises, but the volume of information that changes within that multitenant database is generally much less than would be expected for email notifications. Accordingly, an EMM platform would generally need an independent proxy to handle the additional load of email notification.

Disadvantages of providing notifications directly between the cloud extender and a notification server include additional management difficulty of maintaining security certificates for each cloud extension agent, which may be difficult depending on the vendor policies of the push notification server and potential firewall configuration issues, as the cloud extension agent must communicate through a corporate firewall to a notification server using the TCP port selected by that notification server, which may not be a port commonly open on the corporate firewall.

Using either of these embodiments, a push notification service allows notifications to reach the mobile device operating system, allowing the user experience to be substantially similar to the features for a native email application. Notifications can be used by the application and operating system of the mobile device to update information on a notification bar or notification screen of the device. One example of the user interface for notifications is updating the icon of the email application with a number overlaid on the icon, which may be referred to as a badge. Each time a notification is received, the badge count can be updated to reflect the number of pending messages at the server. In response to seeing the badge, a user can open the email application and retrieve the unread emails from the server. Another example of notifications is the display of a small icon at the top of the device home screen that indicates that one or more messages are pending. By selecting this notification bar, a user can receive additional information about the pending messages, such as the number of pending messages, and in some embodiments, a small snippet for each pending message or details about the sender, subject, or other header information. This information can be conveyed to the mobile device via the push notification service. In response to notifications, the user can access the email application, which may access email in any conventional method.

In some embodiments, a user can configure preferences for notifications on each mobile device he uses to access messages. For example, a user may use certain preferences on his tablet, while using different preferences on his mobile phone. For example, a user may select to receive notifications about any unread messages received in the last 48 hours on his mobile phone, while selecting to receive notifications about any unread messages received in the last week on his tablet. Accordingly, a badge count or other notification information may be different for each of these devices when the user interfaces with the notification screen of the device. The cloud extension agent can maintain a database of the preferences for each device, allowing the cloud extension agent to calculate a badge count for each device and send custom notifications for each device. For example, a user may receive a notification via the push notification service from the cloud extension agent at his corporate network that there are eight pending messages meeting the notification criteria of his mobile phone, while there are twelve messages pending that meet the notification criteria of his tablet. In this example, when a new email is received, the cloud extension agent will push notifications for each of the mobile devices of the user.

Figure 3:
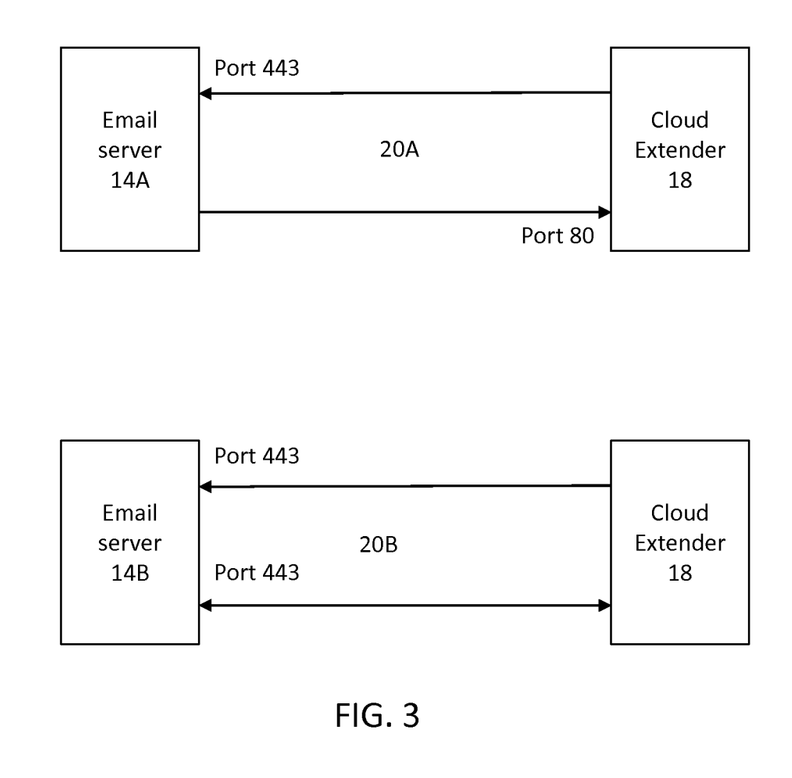
FIG. 3 is to simplified network diagrams for communications between the cloud extension agent and email server for use with some embodiments.

FIG. 3 shows two examples of how a cloud extension agent 18 can interface with an email server 14 over an internal network link 20. The first example, email server 14A is a Microsoft Exchange 2007 server. Cloud extension agent 18 registers with email server 14A to receive push notifications of pending messages over an HTTPS link, via TCP port 443 of the server. In accordance with the registration received from cloud extension agent 18, email server 14*a* can contact the cloud extension agent via an HTTP link via port 80 of the agent. Once notifications are received, cloud extension agent 18 can query for detailed mailbox status over the HTTPS link. This notification model is consistent with Exchange 2007 servers. The HTTPS and HTTP links constitute a network link 20A within the corporate network. Alternatively, when interfacing with Exchange 2010 or later email servers, cloud extender 18 can register for streaming notifications via HTTPS port 443 on exchange email server 14B. A persistent HTTPS connection can then be established via port 443 between the cloud extension agent and the server, allowing notifications to be securely transmitted between the cloud extension agent 18 and exchange email server 14B. The HTTPS connections between cloud extension agent 18 and email server 14B constitute a network link 20B within the corporate network.

Figure 4:
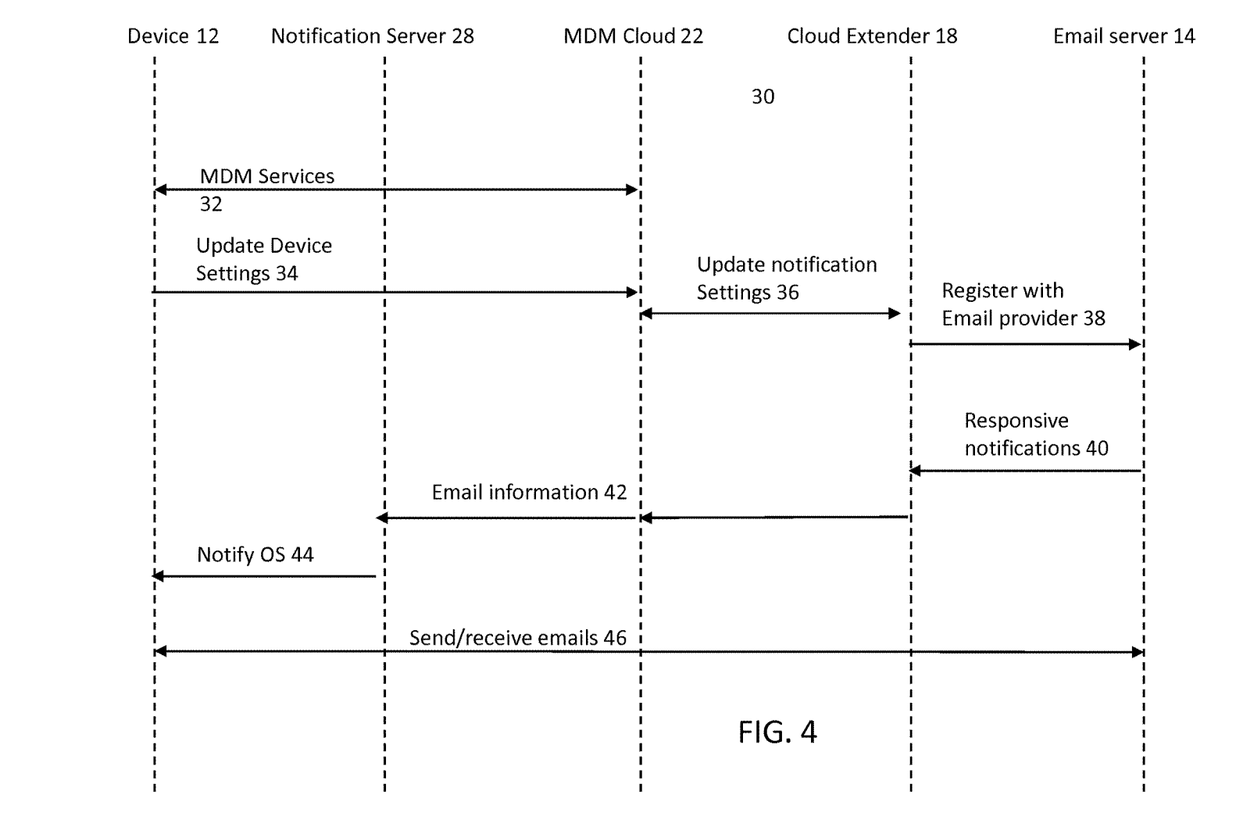
FIG. 4 is a network timing diagram and flow chart illustrating exchange of information in accordance with an exemplary system for providing notifications for use with some embodiments.

FIG. 4 shows an exemplary communication timing diagram 30 for use with the embodiments shown in FIGS. 1 and 2. Communications regarding EMM services 32 are sent and received between each device 12 and EMM cloud 22. Services 32 can be exchanged asynchronously with respect to the other communications in FIG. 4. Exemplary management services 32 can include configuration of device 12 and reporting of status information related thereto. EMM services 32 can also result in communications between EMM cloud 22 and email server 14, as facilitated by cloud extender 18. The remaining communications can be thought of as steps in a method. At step 34, device 12 communicates device settings to EMM cloud 22. This step can occur in response to a user updating his settings via a settings option screen on the device, which may be accessed via an EMM app or an email application that works with the EMM app. The settings can reflect the notification preferences of the user on that particular device. For example, a user may select his preferences for how far back in time he wishes to receive notifications of unread messages, such as two days. Once EMM cloud 22 processes these preferences, EMM cloud 22 can identify whether or not the notification model of cloud extension agent 18 needs to be updated. If so, at step 36, EMM cloud 22 reports these notification settings to cloud extension agent 18 via connection 25. Once cloud extension agent 18 receives these settings, at step 38, the cloud extension agent can register to receive notifications in accordance with those settings from server 14, over internal link 20. Cloud extension agent 18 can also update its internal settings to reflect the notification settings of each device. These internal settings can enable the cloud extension agent to determine when and to send notifications and how to update badge counts pertaining to these notifications for each device. The cloud extension agent can use the user preferences for each device to calculate a badge count pertaining to pending notifications to be sent as part of a notification pushed to each device.

Once notifications are registered with email server 14, at step 40, whenever email server 14 receives new messages for a user, email server 14 reports that there are new messages and notifications pending for that user. In some embodiments, at that point, cloud extension agent 18 can query email server 14 to get information needed to calculate an updated badge count for each mobile device that will receive notification of the new message, as well as any additional information such as sender, subject, or a brief snippet, which may be reported to each mobile device in accordance with the notification settings received at step 36. Thus, in some embodiments, step 40 results in various exchanges between email server 14 and cloud extension agent 18. At step 42, once the cloud extension agent has determined the content of notifications to be sent to each mobile device for a user, such as an updated badge count and any header or snippet information, cloud extension agent 18 sends a notification containing the requisite email information to push notification server 28. In some embodiments, step 42 utilizes notification proxy 26 (which is part of EMM cloud 22) to send the notification messages to push notification server 28, while in other embodiments, cloud extension agent 18 directly contacts notification server 28.

Once notification server 28 receives the notification request from cloud extension agent 18, notification server 28 can push the notification to the operating system of device 12, at step 44. The contents of this notification can be determined by cloud extension agent 18 in accordance with user preferences. Once mobile device 12 receives the notification from notification server 28, the mobile device operating system updates the notification screen or badge count of an icon, or any other notification user interface needed to notify the user of pending messages. Once a user has been notified of pending messages, he may open the email application that is registered to receive emails from email server 14, and send and receive emails upon opening that application, at step 46. Step 46 may be a generally asynchronous process to the rest of the notification process, as emails may be sent and received on demand, based on user interaction.

Figure 5:
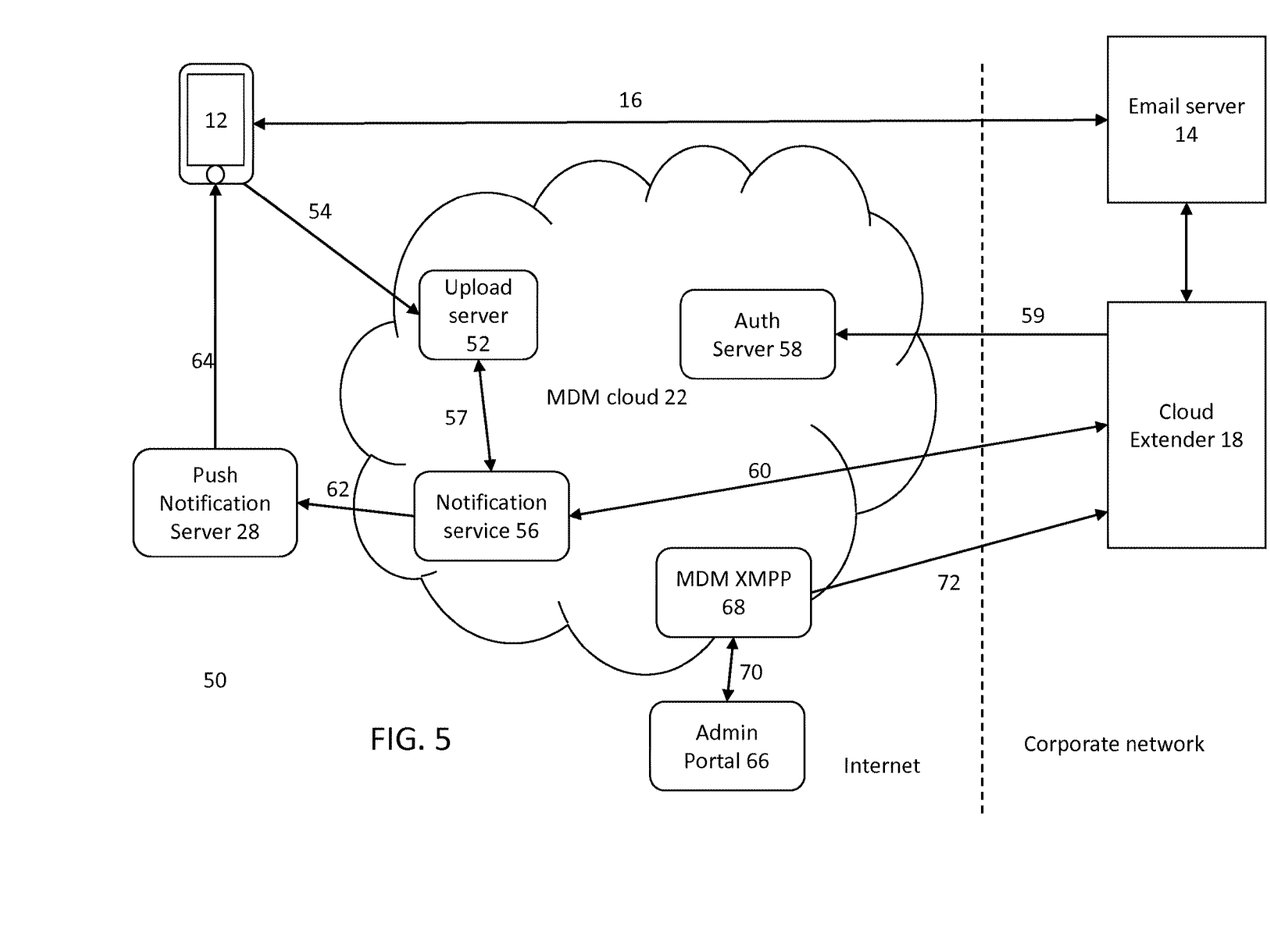
FIG. 5 is a system diagram for an exemplary system for providing notifications in accordance with some embodiments.

FIG. 5 is a functional diagram of an exemplary system 50 that facilitates notifications of pending messages to mobile devices, in accordance with some embodiments. In the system 50, mobile device 12 communicates with the email server 14 across the Internet link 16. Link 16 enables mobile device 12 to send and receive emails normally with email server 14 on a corporate network. When a user wishes to update notification settings on device 12, device 12 communicates the updated settings received from the user to upload server 52 across path 54. Upload server 52 is part of EMM service cloud 22. Path 54 is an IP path to EMM service cloud 22 from mobile device 12. Upload server 52 provides a module for receiving settings updates from a plurality of mobile devices being managed by EMM service cloud 22. Upload server 52 receives settings updates and communicates these to notification service 56 over internal VPN link 57. VPN link 57 provides an internal communications path within service cloud 22 to allow settings for mobile devices to be synchronized with notification service 56. Notification service 56 facilitates updating cloud extension agents and sending notifications from these extension agents to push notification services provided by mobile device vendors.

Cloud extension agent 18 communicates with an authorization server 58 across link 59. Link 59 can be an outbound connection across the corporate network firewall, allowing cloud extension agent 18 to authenticate and authorize additional communications with the service cloud. When a cloud extension agent starts up, and periodically thereafter, cloud extension agent 18 can reach out to authorization server 58 to receive updated credentials, allowing additional communications with EMM service cloud 22. Once credentials are updated, cloud extension agent 18 can communicate with notification service 56 across link 60. Link 60 can be a secure link utilizing HTTPS or HTTP commands to receive scheduled updates or asynchronous updates about user preferences on device 12. In response to a synchronization request by cloud extension agent 18, notification service 56 can communicate the updated settings that identify how notifications should be delivered to device 12. In some embodiments, synchronization is driven by requests from cloud extension agent 18, while in other embodiments, notification service 56 drives settings updates, delivering these updates to cloud extension agent 18 in real time.

Once cloud extension agent 18 is updated with the user's preferred settings, when emails are received by email server 14, notifications can be provided by the email server to cloud extension agent 18. Cloud extension agent 18 can calculate badge counts and determine proper notification based on user settings. Cloud extension agent 18 then provides notifications across link 60 to notification service 56. Notification service 56 can then facilitate delivery of notifications utilizing push notification server 28, communicating with that server over link 62. Link 62 can be governed by the protocols controlled by a mobile device vendor. For example, notification service 56 can act as a proxy having a certificate provided by the mobile device vendor, allowing authorized communication with push notification server 28. Push notification server 28 then communicates over link 64 to mobile device 12, delivering the push notification via the mobile device vendor's protocols.

System 50 also includes a web-based portal for allowing a corporate administrator to manage cloud extension agent 18. An administrative portal 66 is provided via a web browser by mobile device service cloud 22. The administrative portal on an administrator's web browser communicates via link 72 an XMPP server 68 provided by the EMM vendor. Using administrator portal 66, an administrator can request synchronization of settings for a cloud extension agent 18. An administrator can also set the periodicity by which cloud extension agent 18 will communicate with notification service 56 to seek additional updates. XMPP server 68 communicates administrative requests for synchronization or other settings set via administrative portal 66 to cloud extension agent 18 over link 72. Link 72 can be an outbound initiated connection provided by cloud extension agent 18 through a corporate firewall, allowing cloud extension agent 18 to receive commands from XMPP server 68 across a corporate firewall.

Figure 6:
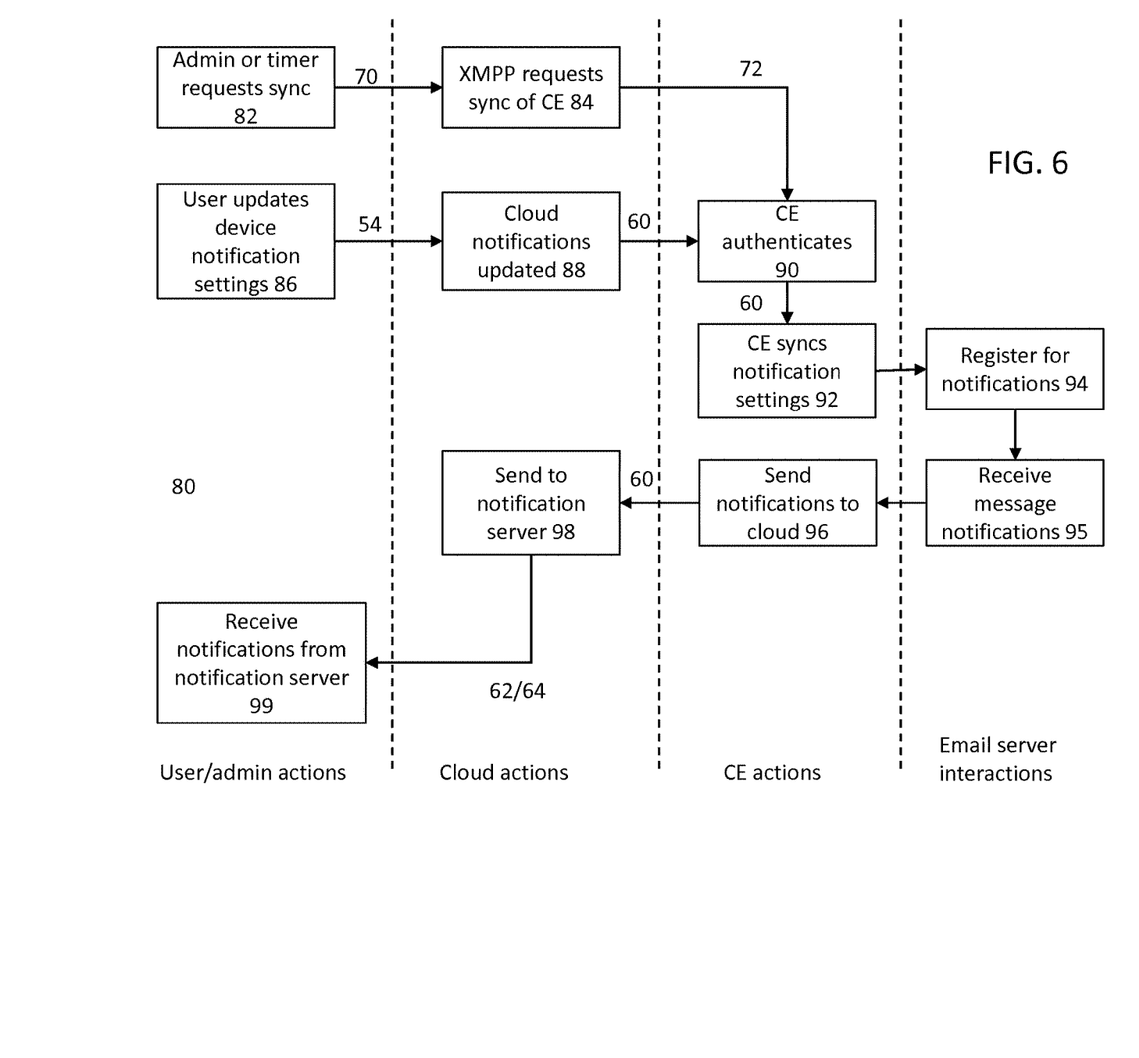
FIG. 6 is a flow chart illustrating an exemplary method or providing email notifications for use with some embodiments.

FIG. 6 is an exemplary method 80 for use in carrying out notifications to mobile devices. Method 80 may be used with the system 50 shown in FIG. 5. To aid in understanding of how method 80 may be used with system 50, links between steps have been labeled with exemplary network links from system 50 that may be used to carry out these steps. At step 82, an administrator or a timer requests synchronization of the cloud extension agent. This may be carried out via administrator portal 66. This results in a request sent over a network link 70 to XMPP server 68. At step 84, the XMPP server requests synchronization of the cloud extension agent over network link 72, which can traverse the corporate firewall.

At step 86, a user updates device notification settings on his device 12. These settings are sent to the EMM service cloud via network link 54. At step 88, the service cloud updates notification settings for that device. Steps 82 and 86 can occur asynchronously. In some embodiments, either step 84 or step 88 can initiate synchronization of the cloud extension agent. Accordingly, the cloud extension agent can receive a request to synchronize via links 60 or 72.

At step 90, the cloud extension agent begins a synchronization process by authenticating with authorization server 58, using link 59. At step 92, using this authentication information, the cloud extension agent can synchronize notification settings with notification service 56 over link 60, to receive updated notification settings for each user's device via the cloud. At step 94, in response to any changes in notification settings, the cloud extension agent can register with email server 14 to receive any updated notification information necessary to comply with the notification settings. At step 95, when emails are received, the email server can send notifications about pending messages to the cloud extension agent. At step 96, the cloud extension agent calculates any notification information, such as badge counts, etc. and prepares notifications to be sent to a notification server. These notifications can be sent over link 62 to notification service 56, allowing the cloud to facilitate sending the notifications to push notification server 28. At step 98, notification service 56 sends notifications to push notification server 28, allowing the push notification server to facilitate push notification to device 12. At step 99, device 12 receives appropriate notifications in accordance with settings for that device, allowing a user to receive notification of pending messages without leaving the email application open on the device.

Figure 7:
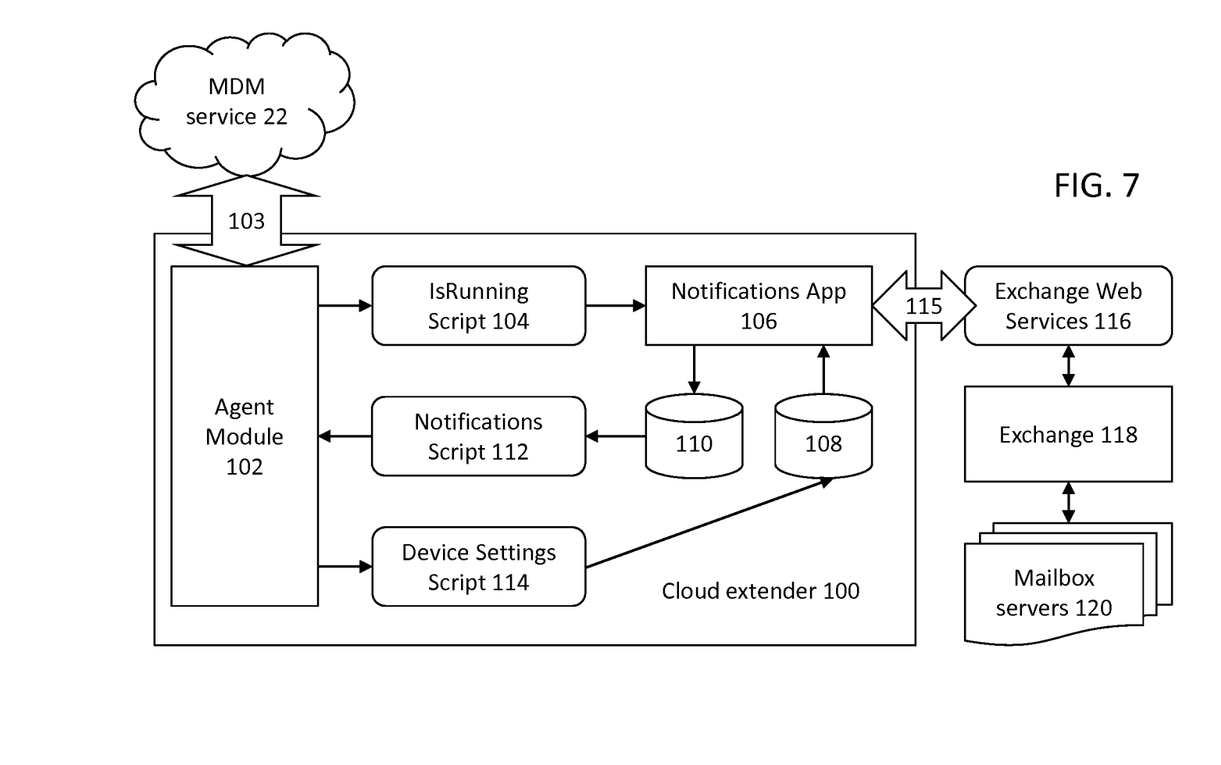
FIG. 7 is a system diagram for an exemplary cloud extension agent for use with some embodiments.

FIG. 7 is a functional diagram of an exemplary cloud extension agent 100, showing various software components that can be used in some embodiments to facilitate notification services. Cloud extension agent 100 includes an agent module 102 that interfaces with the EMM service cloud 22 and controls various functionality of the cloud extension agent, including handling notification settings and reporting of notifications to mobile devices from a corporate network. Agent module 102 communicates over network link 103, which can traverse the corporate firewall, to received device settings and to report email notifications to the EMM service cloud. Agent module 102 instantiates an IsRunning script 104 that verifies that an instance of notifications app 106 is operating. Notifications app 106 is responsible for processing device settings in database 108, to register to receive notifications for a mail server, and to report these notifications via notifications database 110, which allows the notifications app 106 to report notifications. Databases 108 and 110 act as mailboxes to asynchronously receive settings and to transmit notifications. Notification script 112 is instantiated by agent module 102. Notification script 112 receives notifications placed in database 110 by notifications app 106, such as notifications that a new email is waiting. Notifications app 106 can handle badge count calculation and the like, providing notification script 112 with all necessary information to report the notification to mobile devices. Device settings script 114 is instantiated by agent module 102. Device settings script 114 is responsible for interpreting any received device settings related to notifications and placing updated settings in database 108 so that notifications app 106 can apply the settings when notifications are received. Scripts 104, 112, and 114 can be Lua scripts.

Notifications app 106 is responsible for interpreting device settings and reporting responsive notifications. To do this, notifications app 106 interfaces with exchange web services 116 over an internal network link 115. Exchange web services 116 includes web services provided by an exchange server for registering notifications and settings, and reporting information, such as notifications of pending messages. Exchange web services 116 interface with exchange server 118, which can oversee a plurality of mailbox servers 120. Exchange server 118 can report when a user has new pending messages in mailbox servers 120 to the notifications app via exchange web services 116.

Exemplary notifications that can be displayed to a user on a mobile device in accordance with settings that the user selects can include any of the following. An icon can show a badge count of pending messages; a preview of one or more messages pending can be displayed on a notification screen, the selection of which can be determined by settings, such as all new emails or emails from favorite senders; the device can play a sound for all messages or messages from favorite senders; a calendar invite can be previewed; sounds can be played with respect to calendar invites, which could include new or rescheduled invites or invites from favorite senders. Badge and preview notification settings can be selected by a user via the email app or via an EMM app on the device.

In some embodiments, the following settings can apply to a device. These default device settings can include showing a badge count over an icon for the email app, showing a preview for all important messages or messages from favorite senders, playing a sound for all new emails, displaying a preview for all calendar invites, and playing a sound upon the arrival of all calendar invites.

Badge counts can be calculated by a cloud extension agent, and in some embodiments, updated and recalculated by the mobile device as messages are read on the device. Clicking on a notification can launch the email application, allowing the user to see new messages. In some embodiments, a pin or password can be required before viewing messages.

The following are several exemplary use cases that can occur during operation of a notification system in accordance with some embodiments.

When a new device having a secure email application that works with the EMM service cloud wishes to enroll in notifications, the user can configure the mail application on his device and change the default notification settings, or accept the default notification settings. A pre-existing cloud extension agent capable of handling new email notification is presumed to exist on the corporate network to which the user accesses his email. New email subscription is enabled for that device in the cloud extension agent. Notification settings for the device are sent to the cloud extension agent. Badge counts for unread emails are calculated for the device and notifications via a push notification service are sent to an EMM application on that device. Previews for messages or other notification information can also be sent to that device via the push notification service.

When a new email is sent to a user's mailbox, a badge count of unread emails is calculated for the device via the cloud extension agent and sent via the push notification service to the EMM app on the device. Subject and sender of the email can be extracted from the new message at the cloud extension agent and sent via the notification service. At the device, an audio notification can alert the user that a new message is pending when the notification information is received via the push notification service at the device.

When a new calendar invite is sent to the user's mailbox, a similar process with respect to new email can occur, alerting a user of a new calendar invite in substantially the same manner.

When a user reads a message on his device, and the device is online, the mail server can be notified via ActiveSync or other protocols about the status of that email. The mail server can then send a notification to the cloud extension agent. The cloud extension agent can then recalculate a badge count, or the device itself can recalculate the batch count locally. The cloud extension agent can then send an updated badge count via the push notification service to the device.

When a user reads a message on another device, such as another mobile device for that user or his PC, if that other device is online, the mail server can be alerted via ActiveSync or other protocols, which can trigger a notification to the cloud extension agent. The cloud extension agent can respond to the notification received from the mail server by calculating a new badge count and sending an updated badge count via the push notification service to the user's mobile device, allowing the batch count at that mobile device to be updated, even though that message was read on a device other than the user's mobile device that receives the updated badge count.

If Internet conductivity is unavailable when a user reads a message, the email app on the device can calculate a new batch count. When the device resurfaces with a connection to the mail server, the updated status of read messages can be communicated to the mail server, allowing the updated notification process to occur once the device has an Internet connection.

A similar process can occur when a previously read message is marked as read on either the device or another device of the user. Similarly, when the user deletes message on his mobile device or another device, this change in status can be communicated to the mail server and notifications can be updated via the cloud extension agent to synchronize devices with respect to the deleted email.

Should a device be compromised, such as due a non-compliance state or an administrative action that results in a selective wipe of corporate data from the device, the cloud extension agent can note the change in privileges for that device and stop sending notifications to that device. Similarly, should the endpoint mobility management application or secure email application be removed from the mobile device, the cloud extension agent can be apprised of the change in status of that device and stop sending notification messages to that device.

In some embodiments, for the email notifications, the cloud extender performs the following. It receives from the EMM cloud a list of all email accounts that the cloud extender should monitor, the devices (e.g., iPhones) associated with each email account, and the settings for each device. These settings can include, but are not limited to: how many days of unread emails should be included in the count displayed on the device (the "sync period"); which emails the device should be notified about (e.g., emails from "favorite" contacts only, high priority emails only, all emails); when a sound (alert) should be played; the name of the sound file to be played, etc. The cloud extension agent subscribes to notifications for these email accounts (mailboxes). In some embodiments, this means registering with an Exchange server for notifications of new mail, new appointment invitations, deletions of mail, etc. This can include asking Exchange to notify the cloud extension agent when changes in the current collection of emails for those mailboxes occur. The cloud extension agent then receives notifications for these mailboxes.

When the cloud extension agent receives notification of a new email, it queries Exchange for the number of unread emails in the sync period, queries Exchange for details about the message, e.g., sender and subject, and sends this information to the EMM cloud along with the relevant configuration information (sound file to be played if any, etc.) for each device associated with that mailbox so the EMM cloud can send it to the mobile device.

While many of the embodiments have been disclosed with respect to email, these concepts can be applied generally to any collaborative messaging systems, such as chat, group chat, voice mail systems, etc. Collaborative messages generally refer to human to human messages that can be used to facilitate collaboration between individuals, such as email, text, or chat messages. While email is a useful example of collaborative messaging used throughout, any other type of collaborative messaging system can also be used by substituting another type of messaging server (such as a chat server) capable of delivering other types of collaborative messages for the email messaging server in the illustrative embodiments.

Although the present invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A system for providing notifications to a mobile device comprising:
   a cloud extension agent operating on a computer on a corporate network configured to receive first notification information from an email server on the corporate network and to send a first request for notification of a user of the mobile device via a cloud-based service;
   the cloud-based service configured to receive the first request from the cloud extension agent over the Internet and to send a second request for notification of the user to a notification service provided by a manufacturer of the mobile device; and a mobile application on the mobile device, separate from an operating system of the mobile device configured to allow the user to retrieve email messages from the email server, wherein retrieval of the email messages is not provided by the cloud extension agent or the cloud-based service.

2. The system of claim 1, wherein the notification service is a push notification service provided by a vendor of the operating system of the mobile device.

3. The system of claim 1, wherein the email server is a server provided by an operator of the corporate network.

4. The system of claim 1, wherein the cloud extension agent initiates an outbound connection through a firewall that separates the corporate network from the Internet to the cloud-based service.

5. The system of claim 1, wherein the cloud-based service comprises a endpoint mobility management service that enforces security policies for the mobile device.

6. The system of claim 1, wherein the mobile application is further configured to provide an interface that allows the user to selective change notification settings.

7. The system of claim 6, wherein the mobile application is further configured to report the notification settings to the cloud-based service to allow the cloud-based service to configure the cloud extension agent to utilize the notification settings.

8. A method for providing notifications to a mobile device comprising:
    providing a cloud extension agent for operation on a computer on a corporate network, that is configured to receive first notification information from a messaging server on the corporate network and to send a first request for notification of a user of the mobile device via a cloud-based service;
    providing the cloud-based service configured to receive the first request from the cloud extension agent over the Internet and to send a second request for notification of the user to a notification service provided by a manufacturer of the mobile device; and
    providing a mobile application for operation on the mobile device, separate from an operating system of the mobile device, that is configured to allow the user to retrieve collaborative messages from the messaging server, wherein retrieval of the collaborative messages is not provided by the cloud extension agent or the cloud-based service.

9. The method of claim 8, wherein the notification service is a push notification service provided by a vendor of the operating system of the mobile device.

10. The method of claim 8, wherein the messaging server is a server provided by the operator of the corporate network.

11. The method of claim 8, wherein the cloud extension agent initiates an outbound connection through a firewall that separates the corporate network from the Internet to the cloud-based service.

12. The method of claim 8, wherein the cloud-based service comprises a endpoint mobility management service that enforces security policies for the mobile device.

13. The method of claim 8, wherein the mobile application is further configured to provide an interface that allows the user to selective change notification settings.

14. The method of claim 13, wherein the mobile application is further configured to report the notification settings to the cloud based service to allow the cloud-based service to configure the cloud extension agent to utilize the notification settings.

15. A non-transitory computer readable medium comprising instructions configured to provide:
    a cloud extension agent operating on a computer on a corporate network configured to receive first notification information from an email server on the corporate network and to send a first request for notification of a user of a mobile device via a cloud-based service;
    the cloud-based service configured to receive the first request from the cloud extension agent over the Internet and to send a second request for notification of the user to a notification service provided by a manufacturer of the mobile device; and
    a mobile application on the mobile device, separate from an operating system of the mobile device configured to allow the user to retrieve email messages from the email server, wherein retrieval of the email messages is not provided by the cloud extension agent or the cloud-based service.

16. The computer readable medium of claim 15, wherein the notification service is a push notification service provided by a vendor of the operating system of the mobile device.

17. The computer readable medium of claim 15, wherein the email server is an Exchange server provided by an operator of the corporate network.

18. The computer readable medium of claim 15, wherein the cloud extension agent initiates an outbound connection through a firewall that separates the corporate network from the Internet to the cloud-based service.

19. The computer readable medium of claim 15, wherein the cloud-based service comprises a endpoint mobility management service that enforces security policies for the mobile device.

20. The computer readable medium of claim 15, wherein the mobile application is further configured to provide an interface that allows the user to selective change notification settings.

* * * * *